(12) United States Patent
Lo et al.

(10) Patent No.: US 10,277,507 B2
(45) Date of Patent: Apr. 30, 2019

(54) COMMUNICATION PATH MANAGING METHOD AND COMMUNICATION PATH MANAGING SYSTEM

(71) Applicant: INDUSTRIAL TECHNOLOGY RESEARCH INSTITUTE, Chutung, Hsinchu (TW)

(72) Inventors: Chao-Cheng Lo, Changhua County (TW); Yi-Lun Wen, Taoyuan (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 316 days.

(21) Appl. No.: 15/392,800

(22) Filed: Dec. 28, 2016

(65) Prior Publication Data

US 2018/0159768 A1 Jun. 7, 2018

(30) Foreign Application Priority Data

Dec. 6, 2016 (TW) .............................. 105140274 A

(51) Int. Cl.
*H04L 12/721* (2013.01)
*H04L 12/26* (2006.01)
*G06N 99/00* (2019.01)

(52) U.S. Cl.
CPC ........... *H04L 45/70* (2013.01); *G06N 99/005* (2013.01); *H04L 43/087* (2013.01); *H04L 43/0811* (2013.01); *H04L 43/0894* (2013.01)

(58) Field of Classification Search
CPC ... H04L 45/70; H04L 43/0811; H04L 43/087; H04L 43/0894; G06N 99/005
See application file for complete search history.

(56) References Cited

U.S. PATENT DOCUMENTS 6,434,458 B1 8/2002 Laguer-Diaz et al.
7,154,858 B1 12/2006 Zhang et al.
(Continued)

FOREIGN PATENT DOCUMENTS

CN 204031208 U 12/2014
TW I415490 B 11/2013
(Continued)

OTHER PUBLICATIONS

Munish Bhardwaj, et al., "Network Monitoring in LTE small cell environment." 2015 International Conference on Advanced Computing and Communication Systems (ICACCS—2015), Jan. 5-7, 2015, Coimbatore, India (5 pgs.).
Renato B. Santos, et al., "A Network Monitor and Controller using Only OpenFlow." 2015 Latin American Network Operations and Management Symposium, LANOMS 2015, João Pessoa, Brazil, Oct. 1-3, 2015. IEEE 2015 (8 pgs.).
(Continued)

*Primary Examiner* — Duc C Ho
(74) *Attorney, Agent, or Firm* — Muncy, Geissler, Olds & Lowe, P.C.

(57) ABSTRACT

A communication path managing method and a communication path managing system are provided. The communication path managing method includes the following steps: A plurality of communication paths connected to a vehicle are provided. A plurality of evaluation items of each of the communication paths are analyzed. A demand situation of the vehicle is identified according to a sensing data of the vehicle. An item importance information is obtained according to the demand situation. At least one of the communication paths is selected according to the evaluation items based on the item importance information.

24 Claims, 8 Drawing Sheets

(56) References Cited

U.S. PATENT DOCUMENTS

| | | | |
|---|---|---|---|
| 9,085,353 | B1 | 7/2015 | Beard |
| 9,173,196 | B2 | 10/2015 | Grimm et al. |
| 2004/0022262 | A1 | 2/2004 | Vinnakota et al. |
| 2007/0195730 | A1 | 8/2007 | Cheng et al. |
| 2012/0063335 | A1 | 3/2012 | Cho et al. |
| 2012/0087292 | A1 | 4/2012 | Grimm et al. |
| 2012/0277940 | A1* | 11/2012 | Kumar ................ B61L 27/0027 701/20 |
| 2013/0286846 | A1 | 10/2013 | Atlas et al. |
| 2014/0211613 | A1 | 7/2014 | Hsu et al. |
| 2015/0071108 | A1 | 3/2015 | Lumezanu et al. |
| 2016/0133130 | A1* | 5/2016 | Grimm .................... H04L 67/22 340/905 |
| 2016/0165548 | A1 | 6/2016 | Mohlmann et al. |
| 2016/0232484 | A1 | 8/2016 | Skaaksrud |
| 2017/0256034 | A1* | 9/2017 | Bai ......................... G01C 21/32 |
| 2018/0063767 | A1* | 3/2018 | Matos ................. H04W 40/026 |

FOREIGN PATENT DOCUMENTS

| | | |
|---|---|---|
| TW | I505734 | 10/2015 |
| TW | I520523 B | 2/2016 |
| TW | I536753 | 6/2016 |

OTHER PUBLICATIONS

Y. Saito, et al., "A Fast and Efficient End-to-End QOS Measurement Scheme for Real Seamless Handover," 2007 IEEE 18th International Symposium on Personal, Indoor and Mobile Radio Communications, Athens, 2007 (5 pgs.).

Jenn-Hwan Tarng, et al., "A Radio-Link Adaptive Routing Protocol for Mobile Ad Hoc Networks," 2006 IEEE 63rd Vehicular Technology Conference, Melbourne, Vic., 2006, pp. 678-682.

M. G. Kallitsis, et al., "Fast Algorithms for Optimal Link Selection in Large-Scale Network Monitoring," in IEEE Transactions on Signal Processing, vol. 61, No. 8, pp. 2088-2103, Apr. 15, 2013.

H. C. Ozmutlu, et al., "Zone recovery methodology for probe-subset selection in end-to-end network monitoring," Network Operations and Management Symposium, 2002. NOMS 2002. 2002 IEEE/IFIP, 2002, pp. 451-464.

Automotive revolution-perspective towards 2030: How the convergence of disruptive technology-driven trends could transform the auto industry, McKinsey Advanced Industries (Jan. 2016) (20 pgs.).

Intelligence, Bi. "10 Million Self-driving Cars Will Be on the Road by 2020." Business Insider, Jun. 15, 2016. Web. Apr. 7, 2017. <http://www.businessinsider.com/report-10-million-self-driving-cars-will-be-on-the-road-by-2020-2015-5-6>. (2 pgs.).

Sophic Capital—Drones: A Rising Market—An Industry to Lift your Returns, Sep. 8, 2015 (11 pgs.).

* cited by examiner

COMMUNICATION PATH MANAGING METHOD AND COMMUNICATION PATH MANAGING SYSTEM

This application claims the benefit of Taiwan application Serial No. 105140274, filed Dec. 6, 2016, the disclosure of which is incorporated by reference herein in its entirety.

TECHNICAL FIELD

The disclosure relates to a communication path managing method and a communication path managing system.

BACKGROUND

With the development of wireless communication technology, vehicles can transmit and receive various information via the wireless communication. Currently, the communication path of the vehicle is fixed. For reducing the latency and speeding up the response, the amount of the data may be reduced.

However, the vehicle does not always stay at the same position. With the movement of the vehicle, different situations may be happened. Reducing the amount of data is not usable for all situations. Therefore, it is needed to create a flexible communication path managing method for the vehicle.

SUMMARY

The disclosure is directed to a communication path managing method and a communication path managing system.

According to one embodiment, a communication path managing method is provided. The communication path managing method includes the following steps: A plurality of communication paths connected to a vehicle are provided. A plurality of evaluation items of each of the communication paths are analyzed. A demand situation of the vehicle is identified according to a sensing data of the vehicle. An item importance information is obtained according to the demand situation. At least one of the communication paths for the vehicle is selected according to the evaluation items based on the item importance information.

According to another embodiment, a communication path managing system is provided. The communication path managing system includes a path unit, an evaluating unit, an identifying unit, an analyzing unit and a selecting unit. The path unit is for providing a plurality of communication paths connected to a vehicle. The evaluating unit is for analyzing a plurality of evaluation items of each of the communication paths. The identifying unit is for identifying a demand situation of the vehicle according to a sensing data of the vehicle. The analyzing unit is for obtaining an item importance information according to the demand situation. The selecting unit is for selecting at least one of the communication paths for the vehicle according to the evaluation items based on the item importance information.

Figure 1:
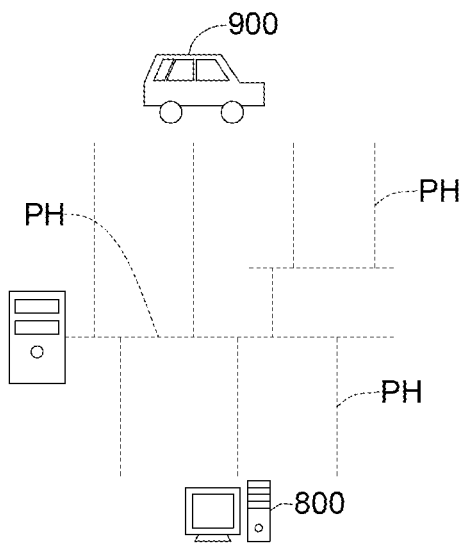
FIG. 1 shows a plurality of communication paths connected to a vehicle.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a plurality of communication paths PH connected to a vehicle 900. The vehicle 900 may be a transportation device or a processing unit disposed on the transportation device. The vehicle 900 can receive the traffic information or internet data. The vehicle 900 is connected to a server 800 for obtaining the information or the data. A plurality of base stations form the communication path PH between the vehicle 900 and the server 800. For example, each of the base stations may be a radio base station at outdoor or a femtocell. The communication paths PH may be operated according the same communication standard, or different communication standards, such as 3rd-Generation (3G), Long Term Evolution (LTE), WiFi, Dedicated short-range communications (DSRC). The characteristics of the communication paths PH are different, and the performance of one communication path PH may be different at different locations. Besides, the performance of some of the communication path PH may be limited to a particular geographical range. Moreover, when the vehicle 900 is moved, the information which the vehicle 900 is needed may be changed. Therefore, it is needed to adaptively evaluate and select the communication paths PH according to the movement of the vehicle 900, such that the vehicle 900 can efficiently communicate with the server 800.

Figure 2:
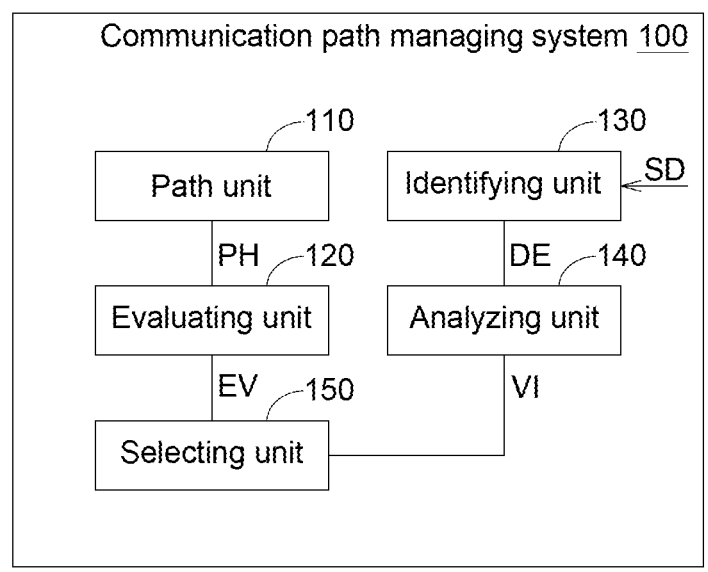
FIG. 2 shows a communication path managing system.
Figure 3:
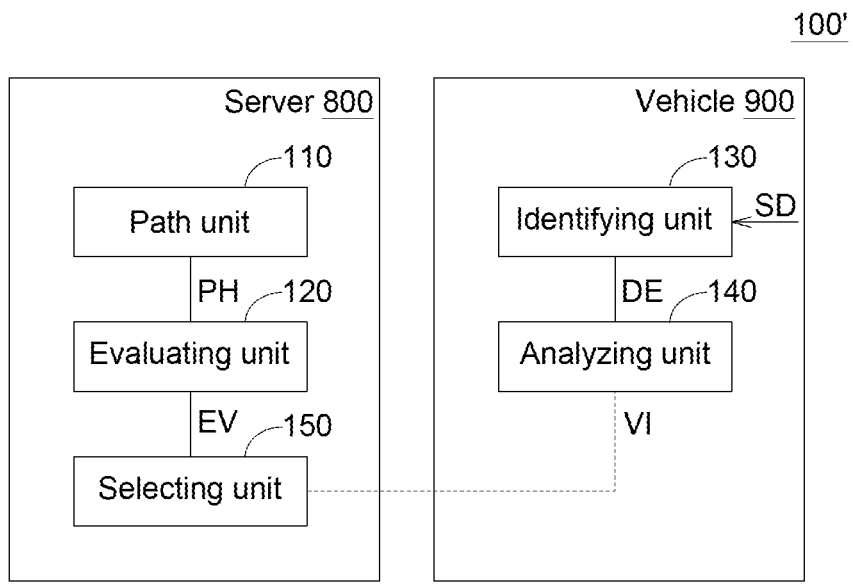
FIG. 3 shows a communication path managing system according to another embodiment.

Please refer to FIG. 2, which shows a communication path managing system 100. The communication path managing system 100 includes a path unit 110, an evaluating unit 120, an identifying unit 130, an analyzing unit 140 and a selecting unit 150. The communication path managing system 100 may be disposed in the vehicle 900, or may be disposed in the server 800. Or, in another embodiment, please refer to FIG. 3, which shows a communication path managing system 100' according to another embodiment. The path unit 110, the evaluating unit 120 and the selecting unit 150 of the communication path managing system 100' can be disposed in the server 800, and the identifying unit 130 and the analyzing unit 140 of the communication path managing system 100' can be disposed in the vehicle 900.

Each of the path unit 110, the evaluating unit 120, the identifying unit 130, the analyzing unit 140 and the selecting unit 150 may be a chip, a circuit, a circuit board, a plurality of program codes or a storage device storing a plurality of program codes which is used for performing various analyzing procedures, various calculating procedures, various data extracting procedures or various data providing procedures. The communication path managing system 100, the server 800 and/or the vehicle 900 may include a processor for executing program codes. The operation of those elements is illustrated via a flowchart.

Figure 4:
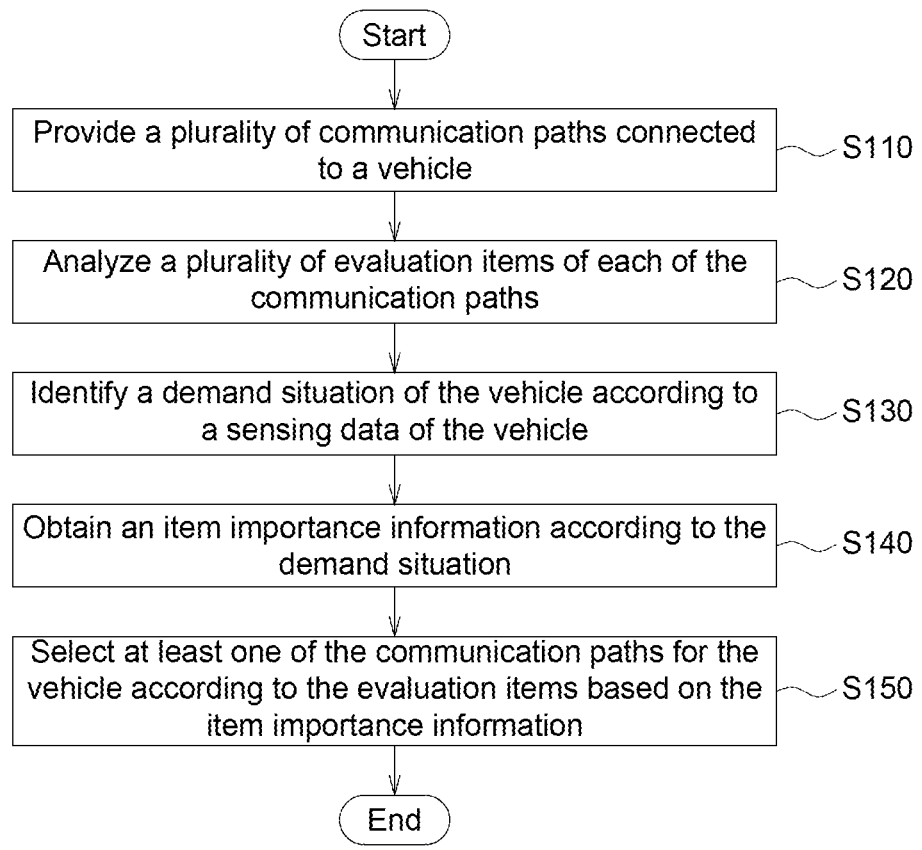
FIG. 4 shows a flowchart of a communication path managing method.

Please refer to FIG. 4, which shows a flowchart of a communication path managing method. In the step S110, the path unit 110 provides the communication paths PH connected to the vehicle 900. The path unit 110 may plan or obtain the communication paths PH according to various data. In one embodiment, the path unit 110 controls the vehicle 900 to broadcast a broadcasting signal, and plans the communication paths PH according to the reply signal received by the vehicle 900. In another embodiment, the path unit 110 may query a lookup table to obtain the communication paths PH according to the location of the vehicle 900.

Next, in the step S120, the evaluating unit 120 analyzes a plurality of evaluation items EV of each of the communication paths PH. For example, the evaluation items EV include a routing path latency, an available bandwidth, a variance of available bandwidth, a connection keeping ability, or a communication cost. Please refer to table I, which shows the values of the evaluation items EV of the communication paths PH.

Table I

| communication path | evaluation item EV | | | |
|---|---|---|---|---|
| | routing path latency | available bandwidth | variance of available bandwidth | connection keeping ability |
| Path 1 | 10 ms | 1000 kbps | 10 | 90% |
| Path 2 | 1000 ms | 10 kbps | 100 | 20% |
| Path 3 | 10 ms | 10 kpbs | 250 | 70% |
| ... | | | | |
| Path N | 100 ms | 1000 kpbs | 250 | 80% |

The lower the value, the better the routing path latency. The higher the value, the better the available bandwidth. The lower the value, the better the variance of available bandwidth. The higher the value, the better the connection keeping ability. Because the characteristics of the communication paths PH are different, the evaluation items EV of the communication path PH will be different. If the vehicle 900 is needed to receive large amount of data in a short time, the communication path PH whose available bandwidth is better can be selected; if the vehicle 900 is needed to update information frequently, the communication path PH whose connection keeping ability is better can be selected.

Figure 5A:
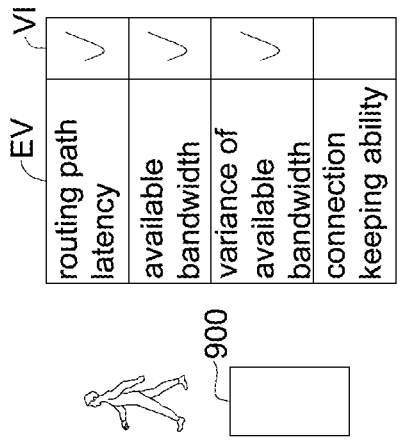
FIGS. 5A to 5F show several examples of the moving status.
Figure 5C:
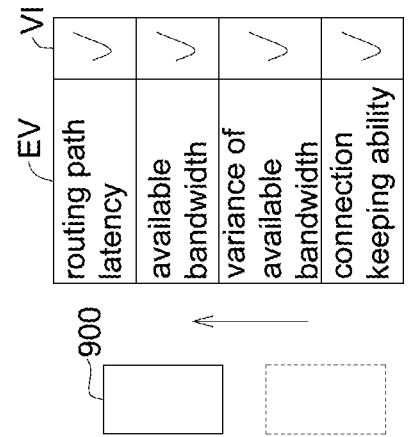
Figure 5B:
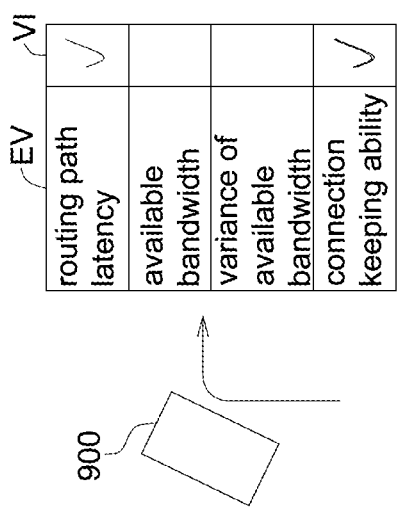
Figure 5E:
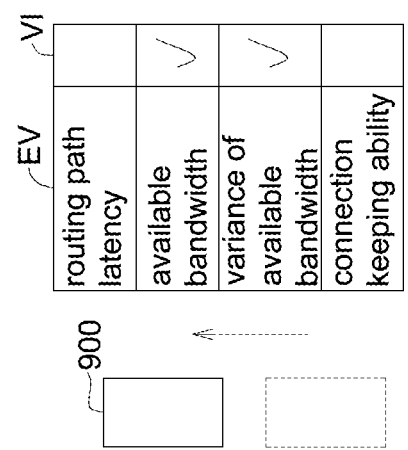
Figure 5D:
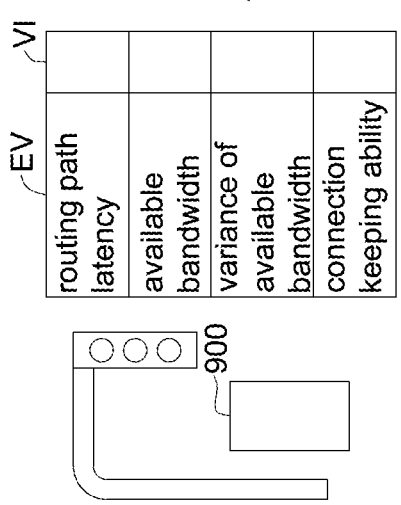
Figure 5F:
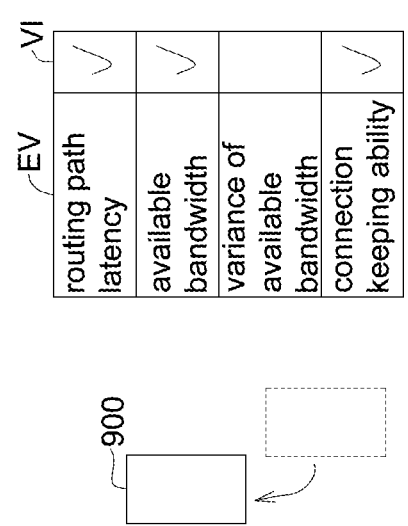

Afterwards, in the step S130, the identifying unit 130 identifies a demand situation DE of the vehicle 900 according to a sensing data SD of the vehicle 900. For example, the demand situations DE include a moving status, a network loading status, an environment status or a cost demand of the vehicle 900. The moving status includes "stopping in front of the red light", "sharp turning", "emergency braking", "changing lanes", "slow forwarding", "fast forwarding", etc. The network loading status includes "fully loading", "idle" and "normal". The environment status includes "single lane", "double lane", "six lane", "fork", and other traffic status on the road. The cost demand includes "cost first" and "efficiency first". Please refer to FIGS. 5A to 5F, which show several examples of the moving status. For example, as shown in FIG. 5A, the moving status of the vehicle 900 is "stopping in front of the red light"; as shown in the FIG. 5B, the moving status of the vehicle 900 is "sharp turning"; as shown in the FIG. 5C, the moving status of the vehicle 900 is "emergency braking"; as shown in the FIG. 5D, the moving status of the vehicle 900 is "changing lanes"; as shown in the FIG. 5E, the moving status of the vehicle 900 is "slow forwarding"; as shown in the FIG. 5F, the moving status of the vehicle 900 is "fast forwarding."

Please refer to table II, which shows several examples of the sensing data SD. In this step, the sensing data SD of the identifying unit 130 includes the gravitation acceleration (G/sec.), including X axial acceleration, Y axial acceleration and Z axial acceleration, the angular acceleration (degree/sec.) and/or the steering wheel rotation (degree), moving speed (Km/h).

TABLE II

| sensing data SD | | | | | |
|---|---|---|---|---|---|
| X axial acceleration (G/sec.) | Y axial acceleration (G/sec.) | Z axial acceleration (G/sec.) | angular acceleration (degree/sec.) | steering wheel rotation (degree) | demand situation DE |
| −94.50 | −66.2 | 15.76 | 1.1 | 50.6 | "sharp turning" |
| −87.63 | −50.43 | 11.23 | 39 | 40.3 | "fast forwarding" |
| 30.5 | 25.53 | 25 | 25 | 50 | "stopping in front of the red light" |
| ... | | | | | |
| 80.51 | 30.5 | 20.5 | 40 | 10 | "changing lanes" |

Figure 6:
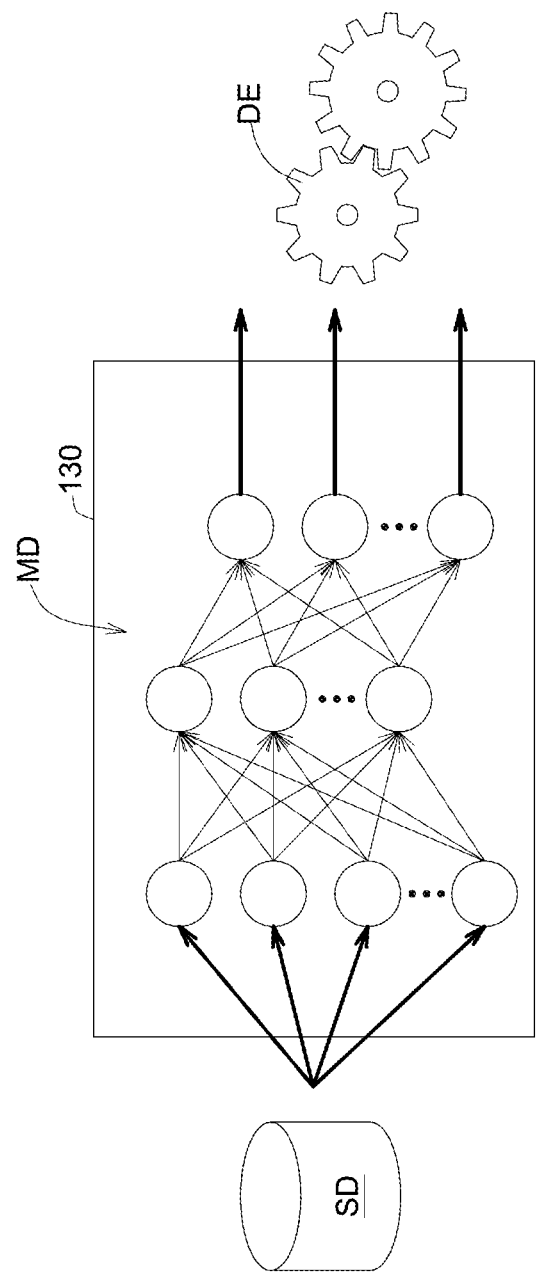
FIG. 6 shows an identifying unit according to an embodiment.

Please refer to FIG. 6, which shows the identifying unit 130 according to an embodiment. In one embodiment, the identifying unit 130 identifies the demand situation DE of the vehicle 900 via a machine learning grouping algorithm, such as an artificial neural network algorithm (ANN algorithm) or a support vector machines algorithm (SVM algorithm). The identifying unit 130 obtains an identifying model MD by training a lot of historical data. In the online application, the identifying unit 130 inputs the sensing data SD to the identifying model MD, and the identifying model MD outputs the demand situation DE accordingly.

Then, in the step S140, the analyzing unit 140 obtains an item importance information VI (shown in the FIGS. 5A to 5F) according to the demand situation DE. The item importance information VI indicates part of the evaluation items EV. For example, in the demand situation DE which is "sharp turning", the item importance information VI indicates that the routing path latency and the connection keeping ability in the evaluation items EV are important; in the demand situation DE which is "emergency braking", the item importance information VI indicates that the routing path latency, the available bandwidth and the variance of available bandwidth in the evaluation item EV are important. In different demand situations DE, the item importance information VI may indicate different part of the evaluation items EV. The item importance information VI may be obtained from the statistical analysis of a large number of data or set by the user.

Next, in the step S150, the selecting unit 150 selects at least one of the communication paths PH for the vehicle 900 according to the evaluation items EV based on the item importance information VI. For example, in the demand situation DE which is "sharp turning", the item importance information VI indicates that the routing path latency and the connection keeping ability in the evaluation items EV are important. So, the selecting unit 150 evaluates the communication paths PH to find out at least one of the communication paths PH whose the routing path latency and the connection keeping ability are best. In one embodiment, the selecting unit 150 may select equal to or more than two communication path PH for the vehicle 900.

Figure 7:
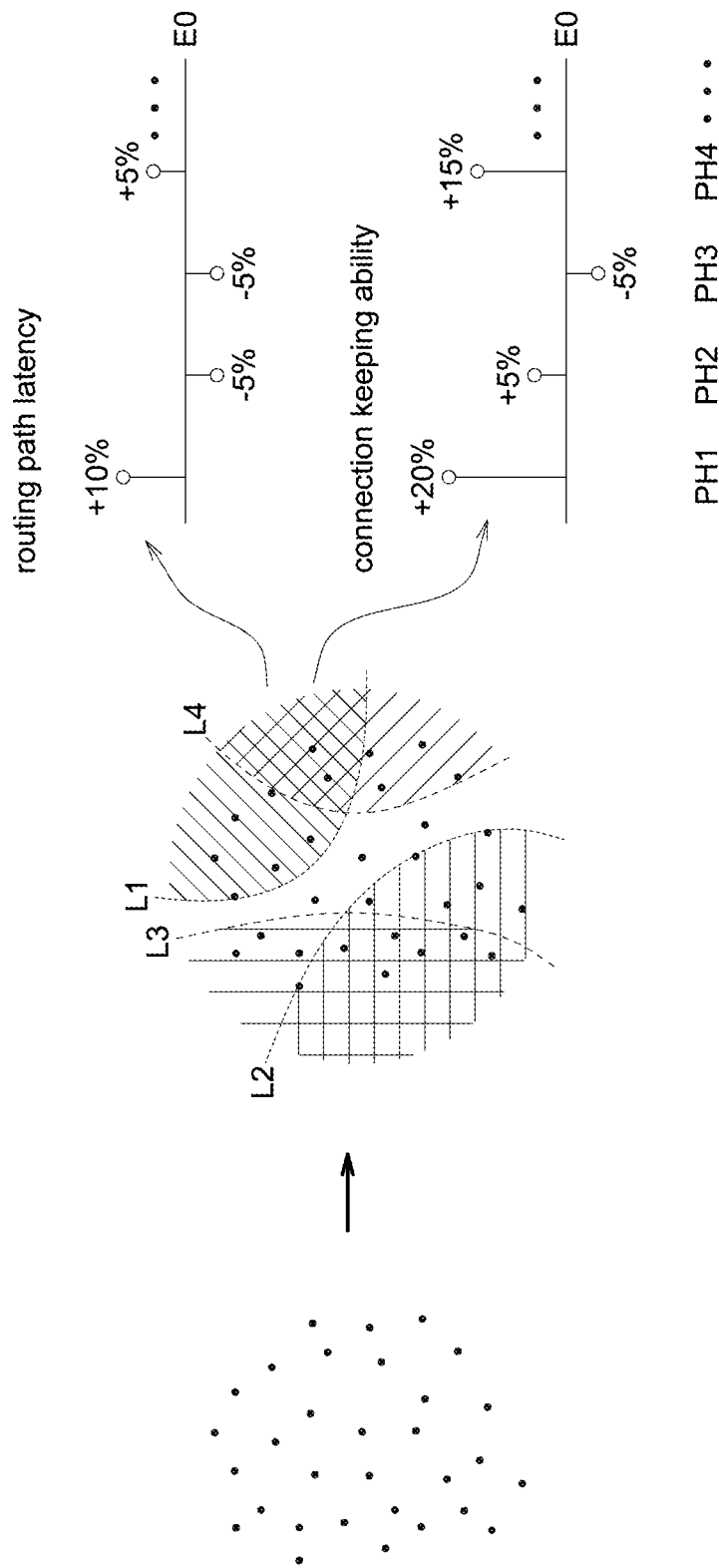
FIG. 7 illustrates the evaluation on the evaluation items.

Please refer to FIG. 7, which illustrates the evaluation on the evaluation items EV. During the evaluation, the selecting unit 150 classifies each of the communication paths PH to know that each of the communication paths PH belongs a good category or a bad category of a particular evaluation item EV. For example, a dotted line L1 is the boundary between the good category of the routing path latency and the bad category of the routing path latency. The shaded area located at the right side of the dotted line L1 belongs the good category of the routing path latency. A dotted line L2 is the boundary between the good category of the available bandwidth and the bad category of the available bandwidth. The shaded area located at the lower side of the dotted line L2 belongs the good category of the available bandwidth. A dotted line L3 is the boundary between the good category of variance of available bandwidth and the bad category of variance of available bandwidth. The shaded area located at the left side of the dotted line L3 belongs the good category of the variance of available bandwidth. A dotted line L4 is the boundary between the good category of connection keeping ability and the bad category of connection keeping ability. The shaded area located at the right side of the dotted line L4 belongs the good category of the connection keeping ability. In the demand situation DE which is "sharp turning", the item importance information VI indicates that the routing path latency and the connection keeping ability in the evaluation items EV are important. The selecting unit 150 selects the communication paths PH which are located in the overlapping area located at the right side of the dotted line L1 and located at the right side of the dotted line L4. Each of the evaluation items EV is set a standard threshold E0. The selecting unit 150 normalizes the values of the evaluation items EV to show how much those values higher (or lower) than the standard threshold E0 via percentages. Both of the routing path latency and the connection keeping ability are taken into consideration to find out the best communication path PH. As shown in the FIG. 7, taking both of the routing path latency and the connection keeping ability into consideration, the score of the communication path PH1 is higher than the scores of the communication paths PH2, PH3, PH4. Therefore, the selecting unit 150 selects the communication path PH1. The steps S110 to S150 are performed every predetermined time interval, for making sure that the vehicle 900 can be connected to the best communication path PH all the time.

According to the embodiments, when the vehicle 900 is moved, the communication path managing system 100 can identify the demand situation DE and obtain the item importance information VI accordingly, such that the best communication path PH can be selected according to the evaluation items EV.

Figure 8:
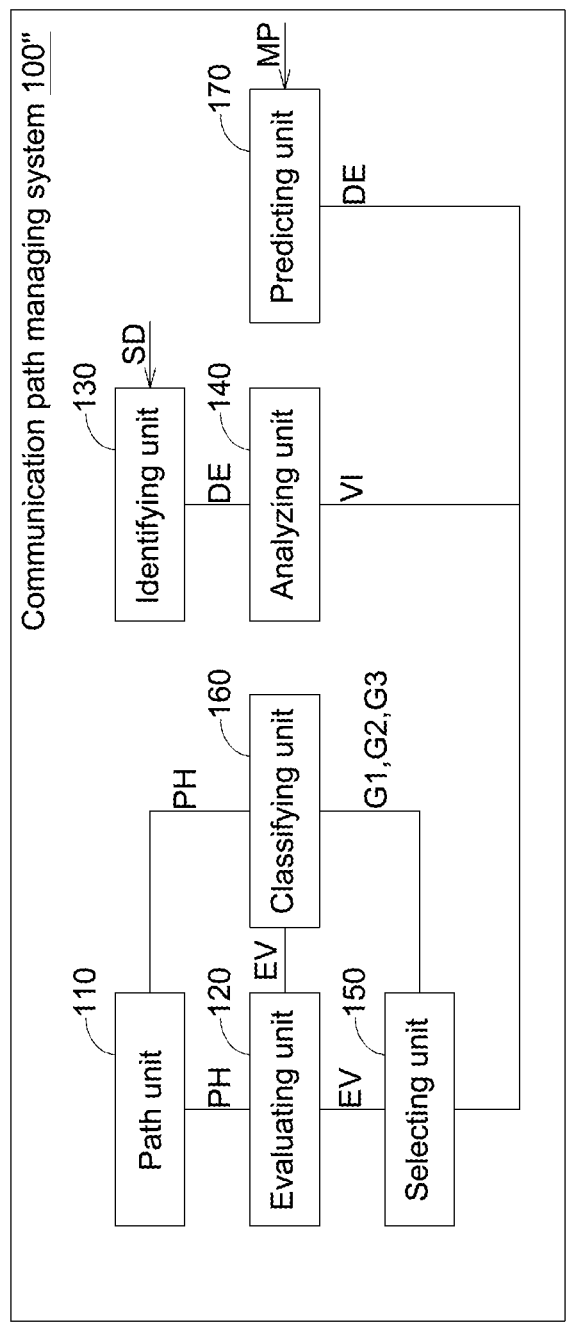
FIG. 8 shows a communication path managing system according to another embodiment.
Figure 9:
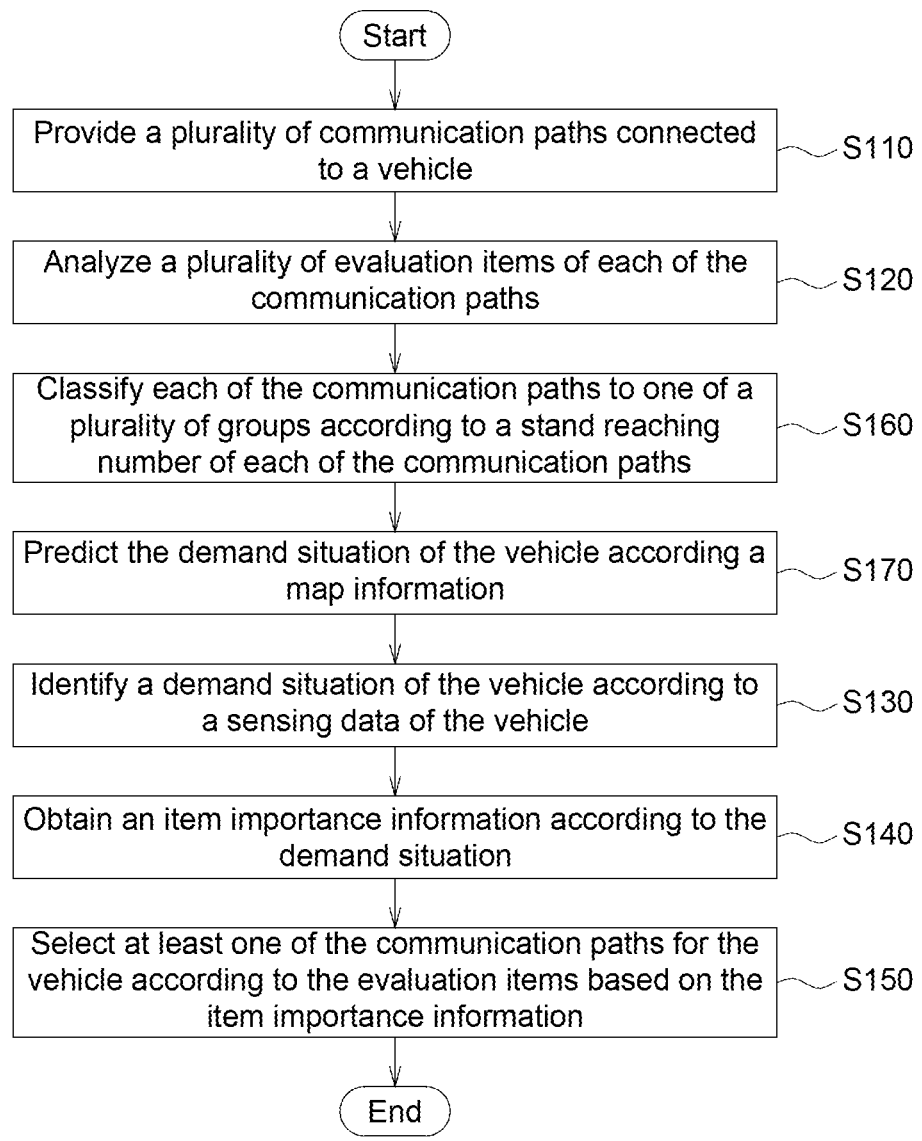
FIG. 9 shows a flowchart of a communication path managing method according to another embodiment.

Please refer to FIGS. 8 and 9. FIG. 8 shows a communication path managing system 100" according to another embodiment. FIG. 9 shows a flowchart of a communication path managing method according to another embodiment. The difference between the FIG. 2 and the FIG. 8 is in that the communication path managing system 100" of the FIG. 8 further includes a classifying unit 160 and a predicting unit 170. The difference between the FIG. 4 and the FIG. 9 is in that the communication path managing method of FIG. 9 further includes the step S160 and the step S170. Each of the classifying unit 160 and the predicting unit 170 may be a chip, a circuit, a circuit board, a plurality of program codes or a storage device storing a plurality of program codes which is used for performing various analyzing procedures, various calculating procedures, various data extracting procedures or various data providing procedures.

In the step S160, the classifying unit 160 classifies each of the communication paths PH to one of a plurality of groups, such as a first group G1, a second group G2 and a third group G3, according to a standard reaching number of each of the communication paths PH. The standard reaching number is a number of the evaluation items EV which are better than the standard thresholds E0 respectively. The standard reaching number of the first group G1 is larger than the standard reaching number of the second group G2, and the standard reaching number of the second group G2 is larger than the standard reaching number of the third group G3. For example, all of the evaluation items EV of each of the communication paths PH in the first group G1 are better than the standard thresholds E0 respectively. Only part of the evaluation items EV of each of the communication paths PH in the second group G2 is better than the standard thresholds E0 respectively. All of the evaluation items EV of each of the communication paths PH in the third group G3 is worse than the standard thresholds E0. In one embodiment, the classifying unit 160 classifies each of the communication paths PH via a machine learning classifying algorithm, such as a K means algorithm or a Gaussian likelihood algorithm. For example, please refer to table III, which shows the examples of classifying the communication paths PH. For example, the standard threshold E0 of the routing path latency is 50 ms. In the good category of the routing path latency, the value of the routing path latency is equal to or lower than 50 ms. The standard threshold E0 of the available bandwidth is 500 kbps. In the good category of the available bandwidth, the value of the routing path latency is equal to or lower than 500 kbps. The standard threshold E0 of the variance of available bandwidth is 20. In the good category of the variance of available bandwidth, the value of the routing path latency is equal to or lower than 20. The standard threshold E0 of the connection keeping ability is 80%. In the good category of the connection keeping ability, the value of the routing path latency is equal to or lower than 80%. As shown in the table III, four of the evaluation items EV of the path 1 are better than the standard thresholds E0 respectively, and the standard reaching number of the path 1 is 4. Four of the evaluation items EV of the path 2 are worse than the standard thresholds E0 respectively, and the standard reaching number of the path 2 is 0. One of the evaluation items EV of the path 3 is better than the standard threshold E0, and the standard reaching number of the path 3 is 1. Two of the evaluation items EV of the path 4 are better than the standard thresholds E0, and the standard reaching number of the path 4 is 2. In the table III, the path whose standard reaching number is 4 is classified to the first group G1, the path whose standard reaching number equal to or larger than 1 is classified to the second group G2; the path whose standard reaching number is 0 is classified to the third group G3.

TABLE III

| communication path | evaluation item EV ||||| group |
| | routing path latency | available bandwidth | variance of available bandwidth | connection keeping ability | standard reaching number | |
| --- | --- | --- | --- | --- | --- | --- |
| Path 1 | 10 ms | 1000 kbps | 10 | 90% | 4 | first group G1 |

TABLE III-continued

| communication path | routing path latency | available bandwidth | variance of available bandwidth | connection keeping ability | standard reaching number | group |
|---|---|---|---|---|---|---|
| Path 2 | 1000 ms | 10 kbps | 100 | 20% | 0 | third group G3 |
| Path 3 | 10 ms | 10 kpbs | 250 | 70% | 1 | second group G2 |
| . . . | | | | | | |
| Path N | 100 ms | 1000 kbps | 250 | 80% | 2 | second group G2 |

After the communication paths PH are classified to the first group G1, the second group G2 and the third group G3, in the step S150, the selecting unit 150 selects the at least one of the communication paths PH according to an order of the first group G1, the second group G2 and the third group G3. For example, the selecting unit 150 selects the communication paths PH in the first group G1 first. Because all of the communication paths PH in the first group G1 are good, so any one of the communication paths PH in the first group G1 can be selected without evaluation. If the communication paths PH in the first group G1 are fully loaded, the selecting unit 150 can select the best of the communication path PH in the second group G2 by evaluation. The evaluation of the FIG. 7 can be used here, similarities will not be repeated here. As such, the selecting unit 150 can complete the selection in a short time.

Figure 10:
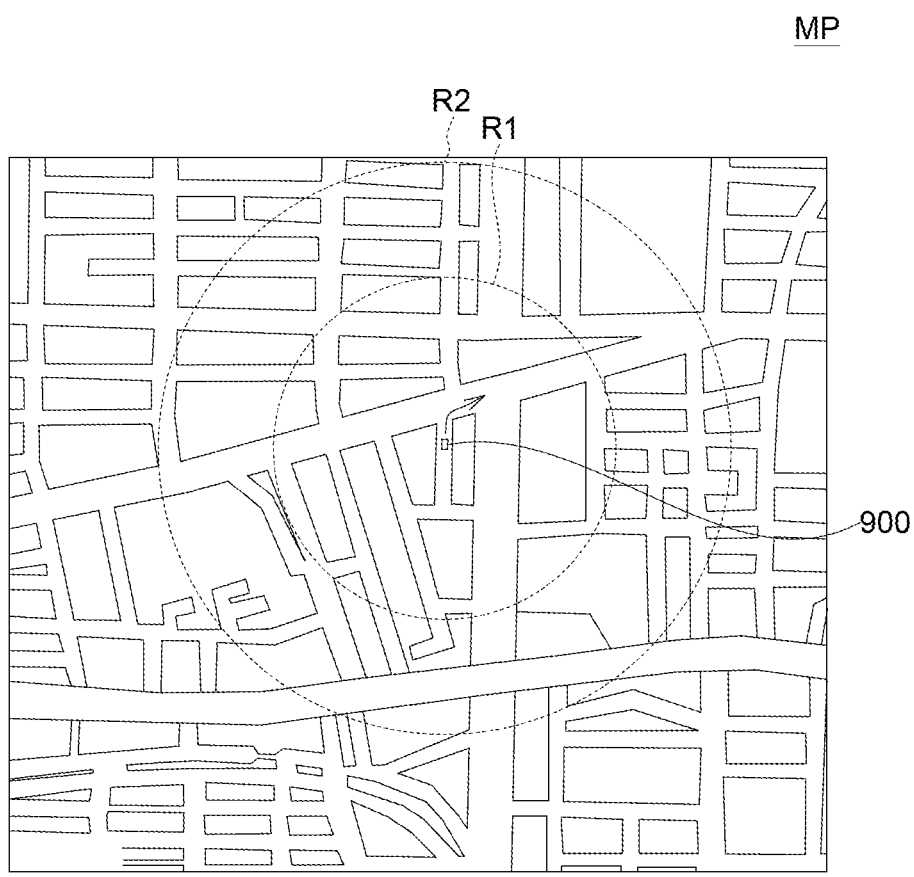
FIG. 10 shows the map information.

In the step S170, the predicting unit 170 predicts the demand situation DE of the vehicle 900 according a map information MP. Please refer to FIG. 10, which shows the map information MP. The predicting unit 170 can predict where the vehicle 900 will move to according to the current location and the moving direction of the vehicle 900. Therefore, the predicting unit 170 can predict the demand situation DE of the vehicle 900, such as "sharp turning", "stopping in front of the red light" and "fast forwarding", in advance. As such, the communication path managing system 100" can select the best communication path PH before the vehicle 900 arrives the next position. Besides, the downloaded range of the map information MP can be adjusted according to the moving speed of the vehicle 900. As shown in FIG. 10, if the moving speed of the vehicle 900 is higher than a predetermined value, then the downloaded range R1 is enlarged to be the downloaded range R2, such that the predicting unit 170 can perform the prediction.

According to the embodiments described above, the communication path managing system 100" can reduce the execution time of the communication path managing method for real time application by classifying the communication paths PH or predicting the demand situation DE.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication path managing method, comprising:
providing a plurality of communication paths connected to a vehicle;
analyzing a plurality of evaluation items of each of the communication paths;
identifying a demand situation of the vehicle according to a sensing data of the vehicle;
obtaining an item importance information according to the demand situation; and
selecting at least one of the communication paths for the vehicle according to the evaluation items based on the item importance information.

2. The communication path managing method according to claim 1, wherein the evaluation items include a routing path latency, an available bandwidth, a variance of available bandwidth and a connection keeping ability.

3. The communication path managing method according to claim 1, wherein each of the evaluation items is set a standard threshold, and the communication path managing method further comprising:
classifying each of the communication paths to one of a plurality of groups according to a standard reaching number of each of the communication paths, wherein the standard reaching number is a number of the evaluation items which are better than the standard thresholds respectively, the standard reaching number of each of the communication paths in one of the groups is different from the standard reaching number of each of the communication paths in another one of the groups.

4. The communication path managing method according to claim 3, wherein in the step of classifying each of the communication paths to one of the groups, each of the communication paths is classified via a machine learning classifying algorithm.

5. The communication path managing method according to claim 3, wherein in the step of classifying each of the communication paths to one of the groups, each of the communication paths is classified via a K means algorithm or a Gaussian likelihood algorithm.

6. The communication path managing method according to claim 1, wherein each of the evaluation items is set a standard threshold, and the communication path managing method further comprising:
classifying each of the communication paths to one of a first group, a second group and a third group according to a standard reaching number of each of the communication paths, wherein the standard reaching number is a number of the evaluation items which are better than the standard thresholds respectively, all of the evaluation items of each of the communication paths in the first group are better than the standard thresholds respectively, only part of the evaluation items of each of the communication paths in the second group are better than the standard thresholds respectively, and all of the evaluation items of each of the communication paths in the third group is worse than the standard thresholds.

7. The communication path managing method according to claim 6, wherein in the step of selecting at least one of the communication paths for the vehicle, the at least one of the communication paths is selected according to an order of the first group, the second group and the third group.

8. The communication path managing method according to claim 1, wherein the item importance information indicates part of the evaluation items.

9. The communication path managing method according to claim 1, wherein in the step of identifying the demand situation of the vehicle, the demand situation of the vehicle is identified via a machine learning grouping algorithm.

10. The communication path managing method according to claim 1, wherein in the step of identifying the demand situation of the vehicle, the demand situation of the vehicle is identified via an artificial neural network algorithm (ANN algorithm) or a support vector machines algorithm (SVM algorithm).

11. The communication path managing method according to claim 1, wherein the demand situations include a moving status, a network loading status, an environment status or a cost demand of the vehicle.

12. The communication path managing method according to claim 1, further comprising:
predicting the demand situation of the vehicle according a map information.

13. A communication path managing system, comprising:
a path unit for providing a plurality of communication paths connected to a vehicle;
an evaluating unit for analyzing a plurality of evaluation items of each of the communication paths;
an identifying unit for identifying a demand situation of the vehicle according to a sensing data of the vehicle;
an analyzing unit for obtaining an item importance information according to the demand situation; and
a selecting unit for selecting at least one of the communication paths for the vehicle according to the evaluation items based on the item importance information.

14. The communication path managing system according to claim 13, wherein the evaluation items include a routing path latency, an available bandwidth, a variance of available bandwidth and a connection keeping ability.

15. The communication path managing system according to claim 13, wherein each of the evaluation items is set a standard threshold, and the communication path managing system further comprising:
a classifying unit for classifying each of the communication paths to one of a plurality of groups according to a standard reaching number of each of the communication paths, wherein the standard reaching number is a number of the evaluation items which are better than the standard thresholds respectively, the standard reaching number of each of the communication paths in one of the groups is different from the standard reaching number of each of the communication paths in another one of the groups.

16. The communication path managing system according to claim 15, wherein the classifying unit classifies each of the communication paths via a machine learning classifying algorithm.

17. The communication path managing system according to claim 15, wherein the classifying unit classifies each of the communication paths via a K means algorithm or a Gaussian likelihood algorithm.

18. The communication path managing system according to claim 13, wherein each of the evaluation items is set a standard threshold, and the communication path managing system further comprising:
a classifying unit for classifying each of the communication paths to one of a first group, a second group and a third group according to a standard reaching number of each of the communication paths, wherein the standard reaching number is a number of the evaluation items which are better than the standard thresholds respectively, all of the evaluation items of each of the communication paths in the first group are better than the standard thresholds respectively, only part of the evaluation items of each of the communication paths in the second group are better than the standard thresholds respectively, and all of the evaluation items of each of the communication paths in the third group is worse than the standard thresholds.

19. The communication path managing system according to claim 18, wherein the selecting unit selects the at least one of the communication paths according to an order of the first group, the second group and the third group.

20. The communication path managing system according to claim 13, wherein the item importance information indicates part of the evaluation items.

21. The communication path managing system according to claim 13, wherein the identifying unit identifies the demand situation of the vehicle via a machine learning grouping algorithm.

22. The communication path managing system according to claim 13, wherein the identifying unit identifies the demand situation of the vehicle via an artificial neural network algorithm (ANN algorithm) or a support vector machines algorithm (SVM algorithm).

23. The communication path managing system according to claim 13, wherein the demand situations include a moving status, a network loading status, an environment status or a cost demand of the vehicle.

24. The communication path managing system according to claim 13, further comprising:
a predicting unit for predicting the demand situation of the vehicle according a map information.

* * * * *